June 10, 1924.  1,497,250
O. H. SOMMERFELD
FRICTION SHOCK ABSORBING MECHANISM
Filed June 13, 1921
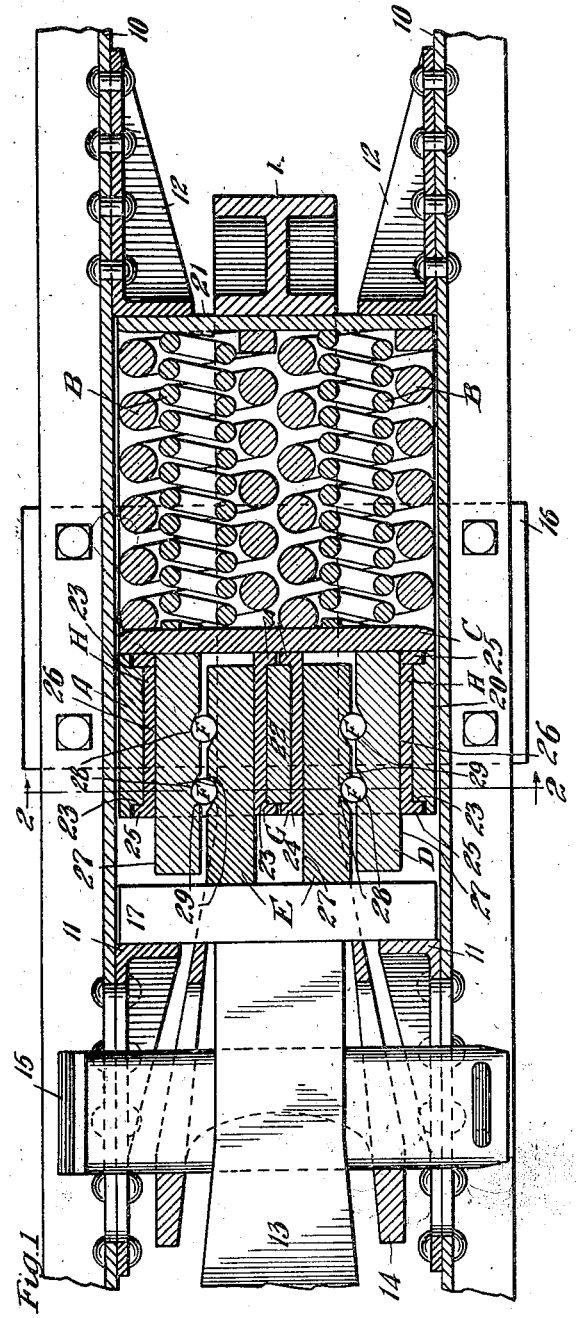
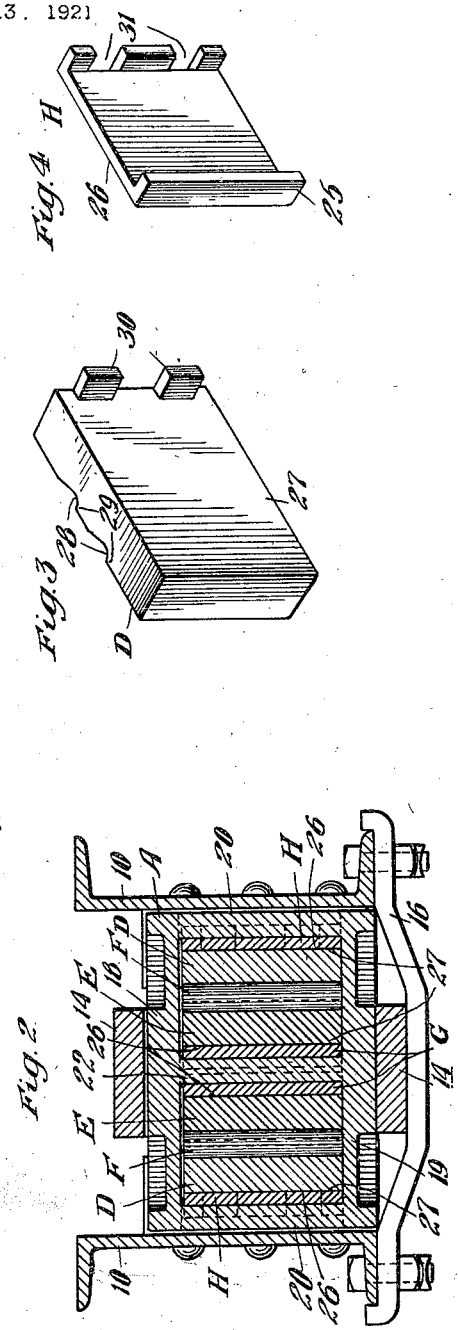
Witnesses
Wm. Geiger
Inventor
Otto H. Sommerfeld
By Geo. I. Haight
His Atty.

Patented June 10, 1924.

1,497,250

UNITED STATES PATENT OFFICE.

OTTO H. SOMMERFELD, OF BLUE ISLAND, ILLINOIS.

FRICTION SHOCK-ABSORBING MECHANISM.

Application filed June 13, 1921. Serial No. 476,981.

*To all whom it may concern:*

Be it known that I, OTTO H. SOMMERFELD, a citizen of the United States, residing at Blue Island, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity, certain release friction shock absorbing mechanism especially adapted for use in railway draft riggings and wherein are provided large friction wearing areas and wherein is obtained long life, preferably by the use of renewable liners or wear-plates.

Another object of the invention is to provide a friction shock absorbing mechanism of the general character above indicated wherein are provided twin arranged friction shells with corresponding duplicated sets of friction elements cooperable therewith, the friction elements being of simple form easily and cheaply manufactured.

A still further object of the invention is to provide a shock absorbing mechanism of the character indicated wherein are employed anti-friction rollers for the purpose of insuring sensitive actions in both compression and release, the number of anti-friction rollers being sufficient and the arrangement thereof such that the pressure per unit length of bearing contact is reduced to an amount avoiding danger of crushing of the rollers or deformation of any of the contacting surfaces.

In the drawing forming a part of the specification, Fig. 1 is a horizontal longitudinal sectional view of a portion of a railway draft rigging showing my improvements in connection therewith. Fig. 2 is a vertical transverse sectional view corresponding substantially to the line 2—2 of Fig. 1. Figures 3 and 4 are perspective views of one of the friction elements and one of the liners respectively.

In said drawing, 10—10 denotes channel draft sills of a railway car to the inner faces of which are secured front stop lugs 11 and rear stop lugs 12. A portion of a draw bar is indicated at 13, the same being operatively associated with the shock absorbing mechanism proper by means of the hooded cast yoke 14 and coupler key 15. The yoke and parts within are supported in operative position by means of a detachable saddle plate 16.

An ordinary main front follower 17 is employed in connection with my improved shock absorbing mechanism proper; the latter, as shown, comprises, broadly, a casting A; twin arranged springs B—B; a spring follower C; outer wedge friction shoes D—D; inner wedge friction shoes E—E; anti-friction rollers F—F; and removable or replaceable friction plates or liners G—G and H—H.

The casting A, as shown, is adapted to act as a column-load-sustaining member or follower-acting member and is provided at the front thereof with top and bottom walls 18 and 19 and side walls 20—20, the same defining a structure of rectangular cross-section as best indicated in Fig. 2. The top and bottom walls are extended to the rear of the casting A and are united by a vertical integral rear wall 21 which functions as the rear follower of the mechanism. The side walls 20—20 are relatively short lengthwise of the casting so as to leave the major portions of the sides open to permit the insertion and removal of the spring follower C and the springs B—B. The casting A is suitably strengthened by ribs and braces as indicated in Fig. 2. In addition, the casting A is formed at the front end thereof with a longitudinally extending integral centrally located web or partition 22 of a length slightly less than that of the side wall 20, and with the latter, providing twin arranged friction shells at the forward end of the casting A. The side walls 20 and partition 22 are cut away or rabbeted at their front and rear edges as indicated at 23—23 so as to provide forwardly and rearwardly facing shoulders to engage the transversely extended end flanges 24—24 on the plates G and the flanges 25—25 on the plates H. The plates G and H may be made of any suitable hardened material as found best adapted to resist wear. With the arrangement just described, it will be evident that the plates G and H are anchored against longitudinal movement in either direction with respect to the casting A and provide on the inner opposed sets of faces, longitudinally extending flat friction surfaces 26—26.

In each of the friction shells above described, there is one set of friction elements, the arrangement of the sets being symmetrical with respect to the center line of the mechanism. Each set comprises a wedge friction shoe D, a wedge friction shoe E and a pair of anti-friction rollers F. Except for a certain detail hereinafter described, the elements E and D are of substantially like construction. Each of said elements is provided on its outer side, that is, the side adjacent a friction surface 26, with a corresponding longitudinally extending flat friction surface 27. On its opposite side, each element D and E is formed with a pair of longitudinally spaced wedge roller seats 28—28. At the appropriate end of each seat 28, a limiting shoulder 29 is provided for the corresponding roller F. The elements D and E are oppositely arranged and the location of the seats 28—28 is made such that, when the parts are assembled in the mechanism, the elements E will project outwardly a short distance beyond the ends of the elements D and, conversely, the inner ends of the elements D will project inwardly a slight distance beyond the inner ends of the elements E, as clearly shown in Figure 1. With this arrangement, the elements E—E are adapted to receive the pressure directly from the draw bar through the follower 17 and the elements D are adapted to bear directly upon the spring follower C.

In order to hold the parts of the mechanism in properly assembled relation, the two wedge friction shoes D are provided at their inner ends with a pair of laterally outwardly extended lugs 30—30, as best shown in Fig. 3. Said lugs are adapted to enter within corresponding notches 31—31 provided in the liners or plates H so that, in normal position of the parts, the inner ends of the elements D, the inner ends of all of the plates G and H and the inner edges of the side walls 20 will lie in a common transverse plane and the spring follower C will bear thereagainst. On account of the lugs 30, it is evident that the elements D are limited in their outward movement with respect to the casting A. The rollers F—F are prevented from moving outwardly with respect to the elements D more than a predetermined amount on account of the limiting shoulders 29 and obviously the elements E will be limited in their outward movement on account of the rollers F engaging the limiting shoulders 29, oppositely disposed, on the elements E. This provides a simple method of holding all of the parts in assembled relation.

It is believed the operation of the device will be apparent from the preceding description in connection with the drawing. By reason of the anti-friction rollers, the wedging or spreading action is set up instantaneously upon the application of the load, and, upon removal of the actuating force, the release is also instantaneous, thus permitting the springs to expand and project all of the parts back to their normal position.

In the arrangement which I have provided, it will be noted that there is a constant or at least, substantially constant area of friction surfaces in use for any part of or for a complete compression movement and hence the resistance afforded will be graduated or proportioned in accordance with the force of the blow struck. The amount of friction area provided is also greater than that now found in certain types of friction draft gears on the market and this factor, combined with the feature of the renewable lines or plates, extends the useful life of the mechanism. It will also be noted that, with each set of friction elements, a plurality of rollers are employed, thus materially decreasing the compression load imposed on each roller and in turn minimizing danger of crushing of the rollers or of deformation or indentation of any of the surfaces in contact with the roller. By employing two rollers with each set of friction elements, I avoid the danger of the two opposed friction elements of each set rocking or oscillating with respect to each other as might possibly occur if merely a single roller were employed which might possibly operate as a fulcrum.

I have herein shown and described what I now consider the preferred manner of carrying out the invention, but the same is merely illustrative and I contemplate all changes and modifications that come within the scope of the claim appended hereto.

I claim:

In a friction shock absorbing mechanism, the combination with a casting having a pair of twin arranged rectangular friction shells at one end thereof, defined by top and bottom walls, side walls and an integral, intermediate partition, the inner sides of said side walls and both sides of said partition being provided with longitudinally extending friction surfaces; of twin pairs of elongated friction elements arranged in said twin friction shells, each of said elements having a friction surface on one side and a pair of longitudinally spaced wedge faces on the opposite side thereof, the friction surfaces of said elements being appreciably longer than the friction surfaces of the shells, one of said elements of each pair having the friction surface thereof coacting with the friction surface of the corresponding side wall, said coacting surfaces having a constant area of contact, and the other element of said pair having the friction surface thereof coacting with the corresponding friction surface of the partition, the last named coacting friction surfaces having a substantially constant area of contact; a pair of rollers interposed between each pair of shoes, coacting with the wedge faces thereof, the rollers of each pair being disposed in a plane parallel to the longitudinal axis of the mechanism; twin arranged springs within the casing disposed inwardly of the shells; and a single follower disposed between the inner ends of the twin arranged springs across the inner end of the intermediate partition, directly engaging the inner end of one shoe of each pair and having its outward movement limited by direct engagement with said casting.

In witness that I claim the foregoing I have hereunto subscribed my name this 1st day of June, 1921.

OTTO H. SOMMERFELD.

Witnesses:
CARRIE GAILING,
ANN BAKER.